Patented Mar. 9, 1937

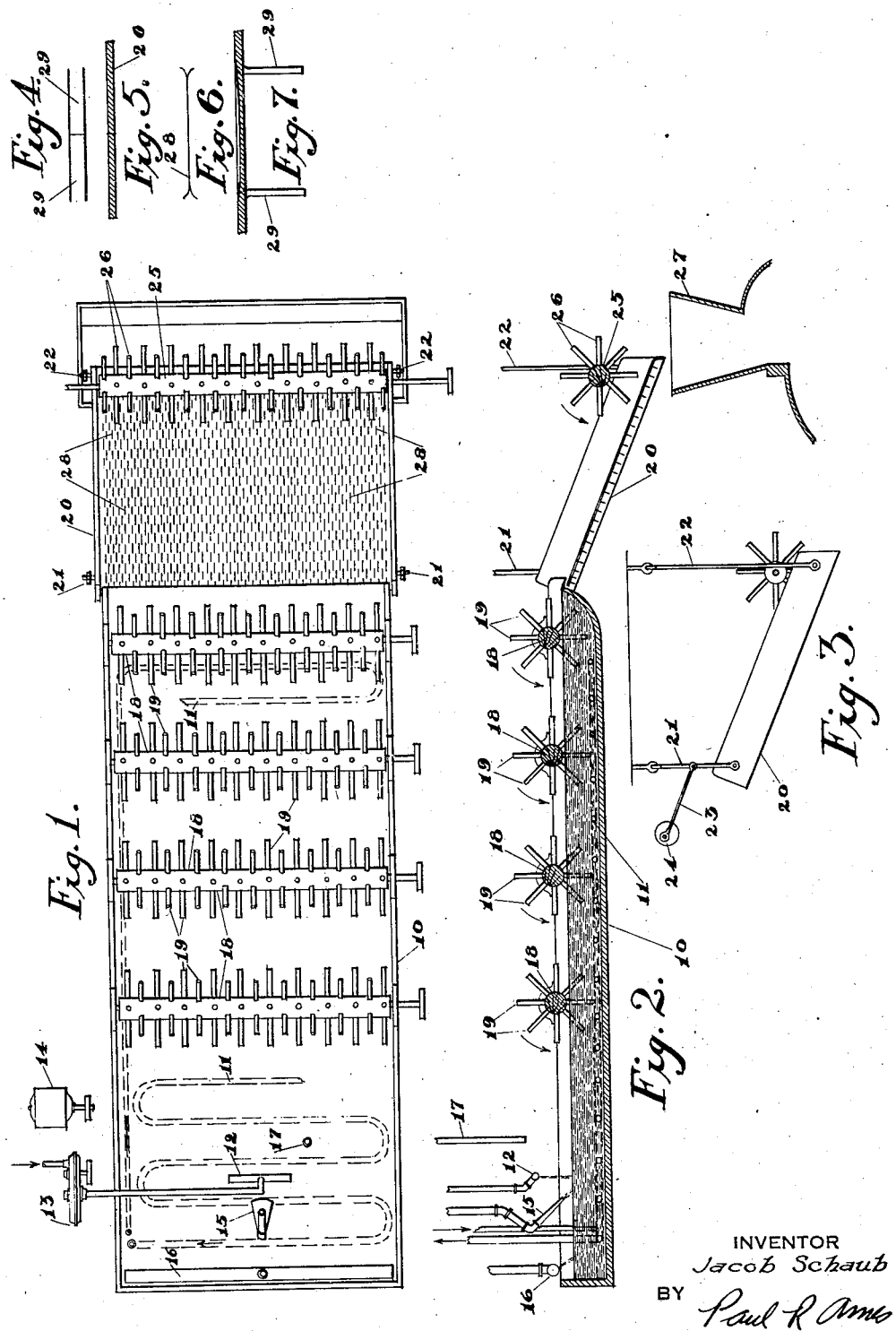

2,073,353

UNITED STATES PATENT OFFICE 2,073,353

APPARATUS FOR PREPARING BUTTER SUBSTITUTES

Jacob Schaub, Westfield, N. J., assignor to The Best Foods, Inc., New York, N. Y., a corporation of Delaware Application July 9, 1932, Serial No. 621,652

14 Claims. (Cl. 210—149)

This invention relates to a device for use in the preparation of butter-like products and more particularly to an improved chilling bath and to means for separating the free water from the chilled crystals.

In describing the invention, reference will be made to the drawing, in which Figure 1 is a plan view and Figure 2 is a sectional view of the improved chilling bath and means for separating the free water from the chilled crystals. Figure 3 is a detailed side elevation of the water separating device, showing means for suspending and vibrating the same. Figures 4 and 5 are plan and sectional views respectively, illustrating an operation in forming the slits in the water separating tray and Figures 6 and 7 are similar views of the formed slits.

In the preparation of butter substitutes, the oil and milk emulsion is first crystallized in a chilling bath, after which it may be conveyed to a working and kneading apparatus, such as that described in my copending application Serial No. 621,651, filed July 9, 1932, entitled "Working and Compressing Apparatus", wherein the crystals are mixed and kneaded to produce the finished margarine.

My improved chilling bath is made up of a tank 10 in which the chilled water is refrigerated to the required degree by the expansion of a refrigerating liquid in a cooling coil 11. The emulsion of cultured milk and oil is forced into the bath in a series of fine streams through the perforated header 12 by the pump 13, which may be driven by any suitable means, such as the motor 14. The partly congealed particles are impelled through the chilled liquid by a stream of water forced through the nozzle 15 and streams of water entering the chilling bath through the header 16. The water in the tank 10 may be recirculated and may pass through suitable purifying and cooling devices inserted in the cycle. Additional water may be added through the pipe 17 to replace any water lost in the operation, including the free water separated from the crystals.

The forward movement of the crystals formed in the chilling bath may be assisted by the rotation of the shafts 18 carrying the pins 19. These shafts may be rotated by any suitable means (not shown) and at the same or varying speeds.

As the crystals which float on the surface of the water reach the end of the bath 10, they are pushed by the pins 19 on the last rotating shaft onto the inclined tray 20. This tray may be suspended by the pivoted hangers 21 and 22 and may be vibrated by the reciprocation of the crank arm 23 actuated by the crank 24, which may be rotated by any suitable means (not shown). A shaft 25, carrying pins 26, similar to the shaft and pins 18 and 19, may be provided at the lower end of the inclined tray 20 to assist in the movement of the crystals into the hopper 27.

In order to remove a portion of the free water from the crystals as they pass down the vibrating, inclined tray 20, numerous slits 28 are provided in the surface of the tray. These are preferably formed as illustrated in Figures 4 to 7. As shown in Figures 4 and 5, an H-shaped cut is made in the bottom of the tray 20. The portions 29 are then bent downwardly to form depending tips, as illustrated in Figure 7. The metal surrounding the opening left thereby is then compressed to expand it laterally so as to substantially close this space, as illustrated in Figures 6 and 7.

In using the term "substantially closed" in the specification and claims it is intended to cover the complete closing of the space between the small openings at the ends of the slits adjacent the tops 29, as well as the partial closing of this space, so as to leave a slight opening or slit between the metal on either side of the opening.

With this arrangement, the plastic material travelling down the inclined tray does not fill up the slit and the free water on the plastic crystals will drain through the openings at the ends of the slits 28 and run down the tips 29.

The crystals, after passing over the inclined tray 20, may fall into the hopper 27 of a kneading and working machine, such as that described in my copending application mentioned above.

It is apparent that many modifications of the above invention may be used and it is not intended to limit the invention to the particular embodiment described. It is also apparent that the water separating device may be used for the separation of liquids from other similar materials and it is not intended to hereby restrict its use to the particular use described. The terms used in describing and claiming this invention are used in their descriptive sense and not as terms of limitation and it is intended that all equivalents thereof be included within the scope of the appended claims.

What I claim is:

1. A liquid separating device comprising a tray having depending tips, capillary openings through the tray communicating with said tips and narrow slits extending longitudinally of the tray and leading to said capillary openings.

2. A liquid separating device comprising an inclined tray having depending tips, capillary openings through the tray communicating with said tips and narrow slits extending longitudinally of the tray and leading to said capillary openings, and means for jarring said tray.

3. A liquid separating device comprising a tray having a slit therein with a tip depending from an end of said slit and with capillary openings through the tray communicating with said tip.

4. A liquid separating device comprising a tray having a plurality of slits therethrough with tips depending from the ends of said slits and with capillary openings through the tray communicating with said tips.

5. A water separating means comprising a tray having a series of narrow slots widened at their ends and with depending tips at each end.

6. A water separating means comprising a tray having a series of narrow slots widened at their ends and with depending tips at each end, the slot walls between said widened ends being shaped to leave only very narrow openings throughout substantially their entire length.

7. A water separating means comprising a tray having a plurality of narrow slots each of which is widened at an end and has a depending tip at such widened end, means for supporting the tray in an inclined position, and means for vibrating the tray.

8. A water separating means comprising a tray having a plurality of narrow slots each of which is widened at an end and has a depending tip at such widened end, a pivoted support for supporting the tray in an inclined position, and means for vibrating the tray comprising a rotatable crank and a crank arm connecting said support to said crank.

9. A device for separating liquid from plastic materials, comprising a plate with a slot therethrough, having a tip depending therefrom and having the metal opposite the opening left thereby shaped to substantially close said opening except adjacent said depending tip.

10. A device for separating liquid from plastic materials, comprising a plate having a slot therethrough and the metal cut from said slot extending outwardly to form a tip depending at each end of the slot, and having the metal opposite the opening left thereby shaped to substantially close said opening except adjacent said depending tip.

11. A method for producing a slotted plate for removing free liquid from plastic materials, comprising cutting through the plate to leave an extending portion, bending this portion outwardly to provide a depending tip, and compressing the metal at each side of the opening left thereby to expand it laterally until said opening is substantially closed throughout its length except at the end adjacent said tip.

12. A method for producing a slotted plate for removing free liquid from plastic materials, comprising cutting through the plate in the form of an H, bending the extending portions outwardly to provide depending tips and compressing the metal at each side of the opening left thereby to expand it laterally until said opening is substantially closed throughout its length except at the ends adjacent said tips.

13. A liquid separating device as defined in claim 3 in which the tray and slit are inclined downwardly and the depending tip is at the lower end of the slit.

14. A liquid separating device as defined in claim 3 in which the tray and slit are inclined downwardly and the depending tip is at the lower end of the slit and means is provided for jarring the tray.

JACOB SCHAUB.